US008897305B2

(12) United States Patent
Son et al.

(10) Patent No.: US 8,897,305 B2
(45) Date of Patent: Nov. 25, 2014

(54) APPARATUSES AND METHODS FOR PROVIDING EMERGENCY SERVICE IN A WIRELESS COMMUNICATION SYSTEM

(75) Inventors: Yeong-Moon Son, Yongin-si (KR);
Hyun-Jeong Kang, Seoul (KR);
Ki-Back Kim, Seongnam-si (KR);
Young-Bae Park, Suwon-si (KR);
Sunny Chang, Seongnam-si (KR);
Sang-Kyou Ryou, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1273 days.

(21) Appl. No.: 12/429,708

(22) Filed: Apr. 24, 2009

(65) Prior Publication Data
US 2009/0268700 A1    Oct. 29, 2009

(30) Foreign Application Priority Data

Apr. 25, 2008  (KR) .................. 10-2008-0038997
Nov. 13, 2008  (KR) .................. 10-2008-0112997

(51) Int. Cl.
*H04L 12/28*      (2006.01)
*H04W 76/00*    (2009.01)
*H04W 4/22*      (2009.01)
*H04W 68/02*    (2009.01)

(52) U.S. Cl.
CPC .............. *H04W 4/22* (2013.01); *H04W 68/025* (2013.01); *H04W 76/007* (2013.01)
USPC ............... 370/395.21; 370/395.3; 370/395.42

(58) Field of Classification Search
None
See application file for complete search history.

(56) References Cited

U.S. PATENT DOCUMENTS

| 7,873,044 | B2 * | 1/2011 | Kang et al. ............. 370/390 |
| 8,102,786 | B2 * | 1/2012 | Dang ...................... 370/310 |
| 8,149,753 | B2 * | 4/2012 | Jeong et al. ............ 370/312 |
| 2003/0097623 | A1 * | 5/2003 | Razavilar et al. ....... 714/704 |
| 2004/0131014 | A1 | 7/2004 | Thompson et al. |
| 2005/0128990 | A1 | 6/2005 | Eom et al. |
| 2005/0159162 | A1 | 7/2005 | Park |
| 2006/0029011 | A1 | 2/2006 | Etemad et al. |
| 2006/0104278 | A1 * | 5/2006 | Chang et al. ........... 370/392 |
| 2006/0194581 | A1 | 8/2006 | Kang et al. |
| 2006/0194598 | A1 * | 8/2006 | Kim et al. .............. 455/509 |

(Continued)

FOREIGN PATENT DOCUMENTS

CN  101137218 A   3/2008
JP  2007-511163 A  4/2007

(Continued)

OTHER PUBLICATIONS

U.S. Appl. No. 60/982,105, Maheshwari et al., filed Oct. 23, 2007.*

(Continued)

*Primary Examiner* — Ashley Shivers
(74) *Attorney, Agent, or Firm* — Jefferson IP Law, LLP

(57) ABSTRACT

Apparatuses and methods for providing an emergency service in a wireless communication system are provided. The method includes allocating a Connection IDentifier (CID) used to transmit the emergency service message, determining a Convergence Sublayer (CS) type for processing the emergency service message, generating a Downlink Channel Descriptor (DCD) message which comprises at least one of the allocated CID and information relating to the determined CS type, and transmitting the generated DCD message to a Mobile Station (MS).

27 Claims, 5 Drawing Sheets

(56) References Cited

U.S. PATENT DOCUMENTS

| | | | |
|---|---|---|---|
| 2006/0203766 A1 | 9/2006 | Kim et al. | |
| 2007/0086380 A1* | 4/2007 | Lim et al. | 370/329 |
| 2007/0086460 A1* | 4/2007 | Choi et al. | 370/390 |
| 2007/0230351 A1* | 10/2007 | Dang | 370/236 |
| 2007/0270118 A1* | 11/2007 | Subramanian et al. | 455/343.2 |
| 2007/0286066 A1 | 12/2007 | Zhang et al. | |
| 2008/0070546 A1 | 3/2008 | Lee | |
| 2008/0227428 A1* | 9/2008 | Rezaiifar et al. | 455/404.1 |
| 2009/0034526 A1* | 2/2009 | Ahmadi et al. | 370/392 |
| 2009/0239554 A1 | 9/2009 | Sammour et al. | |
| 2010/0120392 A1* | 5/2010 | Youn et al. | 455/404.1 |
| 2011/0010610 A1* | 1/2011 | Boariu et al. | 714/807 |

FOREIGN PATENT DOCUMENTS

| | | |
|---|---|---|
| JP | 2007-525128 A | 8/2007 |
| JP | 2008-526092 A | 7/2008 |
| JP | 2009-512315 A | 3/2009 |
| JP | 2011-519497 A | 7/2011 |
| WO | 2007/004769 A1 | 1/2007 |
| WO | 20071004769 A1 | 1/2007 |
| WO | 2007-097571 A1 | 8/2007 |

OTHER PUBLICATIONS

Mark, Roger, IEEE Standard 802.16: A Technical Overview of the WirelessMAN Air Interface for Broadband Wireless Access, IEEE 802.16 Broadband Wireless Access Working Group, Jun. 4, 2002, pp. 98-107.

Loa, Kanchei (Ken) et al., Remedy for relaying DCD, UCD, DL-MAP and UL-MAP messages in the in-band mon-transport scenario, IEEE 802.16 Broadband Wireless Access Working Group, Mar. 5, 2007, pp. 2-4.

Wilson, Joanne et al., Corrections for Reduced Compressed Private Maps, IEEE 802.16 Broadband Wireless Access Working Group, Mar. 9, 2005, pp. 1-6.

Loa, Kanchei (Ken) et al., Remedy for relaying compressed DL-MAP/UL-MAP, HARQ-MAP and SUB-DL-UL-MAP, IEEE 802.16 Broadband Wireless Access Working Group, Jul. 19, 2007, pp. 2-10.

Esaki, Hiroshi, Impress Standard Textbook Series IPv6 Textbook, pp. 124-133.

Shozo, Komaki, Wireless Technology and Application 3 Wireless LAN and Ubiquitous Network, pp. 274-279.

Takashi, Shono, Impress Standard Textbook Series WiMAX Textbook, pp. 186-245.

* cited by examiner

APPARATUSES AND METHODS FOR PROVIDING EMERGENCY SERVICE IN A WIRELESS COMMUNICATION SYSTEM

PRIORITY

This application claims the benefit under 35 U.S.C. §119(a) of a Korean patent application filed in the Korean Intellectual Property Office on Apr. 25, 2008 and assigned Serial No. 10-2008-0038997 and of a Korean patent application filed in the Korean Intellectual Property Office on Nov. 13, 2008 and assigned Serial No. 10-2008-0112997, the entire disclosures of both of which are hereby incorporated by reference.

BACKGROUND OF THE INVENTION

1. Field of the Invention

The present invention relates to a wireless communication system. More particularly, the present invention relates to apparatuses and methods for providing an emergency service.

2. Description of the Related Art

Future communication systems are advancing to providing various high-speed high-capacity services to Mobile Stations (MSs). Examples of future communication systems include the Institute of Electrical and Electronics Engineers (IEEE) 802.16 communication system and the mobile Worldwide interoperability for Microwave Access (WiMAX) communication system. The mobile WiMAX communication system is based on the IEEE 802.16 communication system, and the IEEE 802.16 communication system corresponds to IEEE 802.16 standard.

An emergency service suggested in the IEEE 802.16 communication system is now described.

In general, the emergency service includes a Wireless Emergency Rescue Service (WERS) and a Wireless Emergency Alert Service (WEAS). The WER and WEA services will be explained individually. In a state of emergency such as a fire or a crime, the WERS locates the MS and supports a safe rescue. The WERS includes a voice call service such as a 911 service. Herein, since the WERS is mostly triggered by the MS, the WERS may be referred to as an MS-triggered emergency service. The WEAS includes a service which supports an emergency notification relating, for example, to weather such as a rainstorm, an impending earthquake, or a tidal wave, to the MS in a particular geographical region. Since the WEAS is triggered by a Base Station (BS) in general, the WEAS may be referred to as a BS-triggered emergency service.

The IEEE 802.16 communication system takes into account only the WEAS and suggests merely the operation of the BS for transmitting information relating to a transmission time of an emergency service message to the MS using a Broadcast Control Pointer Information Element (IE) message of a DownLink (DL)-MAP message. Herein, when the MS, in an idle mode or in a sleep mode, is out of service with the BS, the Broadcast Control Pointer IE message is used for the BS to broadcast transmission times of an Uplink Channel Descriptor (UCD) message, a Downlink Channel Descriptor (DCD) message, a MOBile Neighbor Advertisement (MOB_NBR-ADV) message, and the emergency service message to the MS in advance at a period predefined between the MS and the BS. Upon receiving the Broadcast Control Pointer IE message, the MS wakes up at the corresponding time point indicated by the Broadcast Control Pointer IE message or resumes the service with the BS and thus receives the corresponding UCD and DCD messages, the MOB_NBR-ADV message, and the emergency service message.

Operations of the idle MS in the IEEE 802.16 communication system are explained. The idle MS in the IEEE 802.16 communication system receives a MOBile PAGing ADVertisement (MOB_PAG-ADV) message from the BS in a paging listening interval of a preset paging cycle. Herein, the MOB_PAG-ADV message is transmitted from the BS to the idle MS to control the idle MS to carry out a network entry or a location updating. For example, when having DL data to be sent to the idle MS, for the DL data transmission, the BS may control the idle MS using the MOB_PAG-ADV message to wake up and enter the network or to update the location. Herein, the start point of the paging listening interval of the idle MS may differ according to the paging cycle and the paging offset of the idle MS.

As mentioned above, the emergency service message should be received at all of the sleeping MS, the normal MS, and the idle MS, and the message may be broadcast only once. To receive the emergency service message, the idle MS needs to wake up in the idle mode at the transmission time of the emergency service message from the BS and to wait to receive the emergency service message. However, when there is a plurality of idle MSs, the start points of the paging listening interval of the MSs may differ from each other. Accordingly, to inform the idle MSs which wake up at different time points of the transmission time of the emergency service message at a time, it is necessary to transmit the Broadcast Control Pointer IE messages as many times as the number of different start points of the paging listening intervals. However, since the Broadcast Control Pointer IE message includes a plurality of fields, the transmission of the Broadcast Control Pointer IE messages may cause a waste of resources.

In addition, at the emergency service message transmission time informed by the BS to the idle MS using the Broadcast Control Pointer IE message, the BS may fail to transmit the emergency service message. For instance, according to the scheduling of the BS, the emergency service message may be transmitted in a previous frame or a next frame, rather than the emergency service message transmission time indicated by the Broadcast Control Pointer IE message, that is, rather than the emergency service message transmit frame. In this situation, the idle MS, which wakes up according to the emergency service message transmission time indicated by the Broadcast Control Pointer IE message, may not receive the emergency service message in the corresponding frame. However, the IEEE 802.16e communication system does not provide any operating method when the idle MS may not receive the emergency service message at the emergency service message transmission time point indicated by the Broadcast Control Pointer IE message at all.

As discussed above, for the emergency service, the conventional IEEE 802.16 communication system merely defines the operation of broadcasting the information relating to the transmission time point of the emergency service message by use of the Broadcast Control Pointer IE message. In other words, the IEEE 802.16 communication system does not specify a method for providing the emergency service, except for the use of the Broadcast Control Pointer IE message. Thus, what is needed is an improved method for the emergency service in the IEEE 802.16 communication system.

SUMMARY OF THE INVENTION

An aspect of the present invention is to address at least the above-mentioned problems and/or disadvantages and to provide at least the advantages described below. Accordingly, an aspect of the present invention is to provide apparatuses and methods for providing an emergency service in a wireless communication system.

Another aspect of the present invention is to provide apparatuses and methods for a Base Station (BS) to inform a Mobile Station (MS) of a Connection IDentifier (CID) used for transmission of an emergency service message and information relating to a Convergence Sublayer (CS) for processing the emergency service message using a Downlink Channel Descriptor (DCD) message, and for the MS to receive and process the emergency service message using the information in a wireless communication system.

Yet another aspect of the present invention is to provide apparatuses and methods for a BS to inform an idle and sleeping MS of a transmission time of an emergency service message and information relating to a waiting time for waking up and receiving the emergency service message at the transmission time using an Extended Broadcast Control Pointer Information Element (IE) message, and for the idle and sleeping MS to wake up at the transmission time of the emergency service message, wait for the waiting time, and receive the emergency service message using the information in a wireless communication system.

Still another aspect of the present invention is to provide apparatuses and methods for preventing an MS from decoding a Multicast and Broadcast Service (MBS)-MAP message in every frame, by adding a parameter Existence of Emergency Service Message in an MBS region to MBS_MAP_IE and informing the MS of the presence or absence of the emergency service message in the MBS region when the BS is to send the emergency service message over the MBS region a wireless communication system.

In accordance with an aspect of the present invention, a method for transmitting an emergency service message at a BS in a wireless communication system is provided. The method includes allocating a CID used to transmit an emergency service message, determining a CS type for processing the emergency service message, generating a DCD message which comprises at least one of the allocated CID and information relating to the determined CS type and transmitting the generated DCD message to an MS.

In accordance with another aspect of the present invention, a method for transmitting an emergency service message at a BS in a wireless communication system is provided. The method includes determining a transmission time of an emergency service message, determining a waiting time for an MS to receive the emergency service message at the determined transmission time, generating a broadcast control pointer IE which comprises information relating to the transmission time of the emergency service message and the waiting time to receive the emergency service message, and transmitting a DownLink (DL)-MAP message comprising the generated broadcast control pointer IE to the MS.

In accordance with yet another aspect of the present invention, a method for transmitting an emergency service message at a BS in a wireless communication system is provided. The method includes determining whether there exists an emergency service message to transmit in an MBS region, setting a field in an MBS_MAP IE according to the determination, the field indicative of the presence or absence of the emergency service message to be transmitted in the MBS region, and transmitting a DL-MAP message comprising the MBS_MAP IE with the set field to the MS.

In accordance with still another aspect of the present invention, a method for receiving an emergency service message at an MS in a wireless communication system is provided. The method includes receiving a DCD message which comprises at least one of a CID used to transmit the emergency service message and information relating to a type of a CS for processing the emergency service message, and, when receiving the emergency service message comprising the CID, processing the received emergency service message through the CS.

In accordance with a further aspect of the present invention, a method for receiving an emergency service message at an MS in a wireless communication system is provided. The method includes receiving a broadcast control pointer IE through a DL-MAP message, acquiring a transmission time of the emergency service message and information relating to a waiting time for the MS to receive the emergency service message at the transmission time using the received broadcast control pointer IE, and receiving the emergency service message during the waiting time at the transmission time of the emergency service message.

In accordance with a further aspect of the present invention, a method for receiving an emergency service message at an MS in a wireless communication system is provided. The method includes receiving a MBS_MAP IE through a DL-MAP message, confirming setting of a field in the received MBS_MAP IE, the field indicative of the presence or absence of the emergency service message to be transmitted in an MBS region, and when the field setting indicates the existence of the emergency service message to transmit in the MBS region, decoding an MBS MAP message.

In accordance with a further aspect of the present invention, an apparatus for transmitting an emergency service message of a BS in a wireless communication system is provided. The apparatus includes a Media Access Control (MAC) control message generator for allocating a CID used to transmit the emergency service message, for determining a CS type for processing the emergency service message, and for generating a DCD message which comprises at least one of the allocated CID and information relating to the determined CS type, and a transmitter for transmitting the generated DCD message to an MS.

In accordance with a further aspect of the present invention, an apparatus for receiving an emergency service message of an MS in a wireless communication system is provided. The apparatus includes a receiver for receiving a signal, a physical layer decoder for providing a Media Access Control (MAC) Protocol Data Unit (PDU) by decoding the received signal in a physical layer, a MAC PDU decoder for analyzing a header of the MAC PDU, for providing a corresponding payload to a MAC control message analyzer when a payload of the MAC PDU comprises control information, and for providing a corresponding payload to a receive data queue when the payload of the MAC PDU comprises traffic, the MAC control message analyzer for acquiring at least one of a CID used to transmit the emergency service message and information relating to a type of a CS for processing the emergency service message by analyzing a DCD message from the MAC PDU decoder, and the receive data queue for providing the emergency service message from the MAC PDU decoder to a corresponding CS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide apparatuses and methods for providing an emergency service in a wireless communication system. While the apparatuses and the methods for providing the emergency service are illustrated, for example, in an Institute of Electrical and Electronics (IEEE) 802.16 system, the present invention is appli cable to other various communication systems capable of providing the emergency service.

Figure 1:
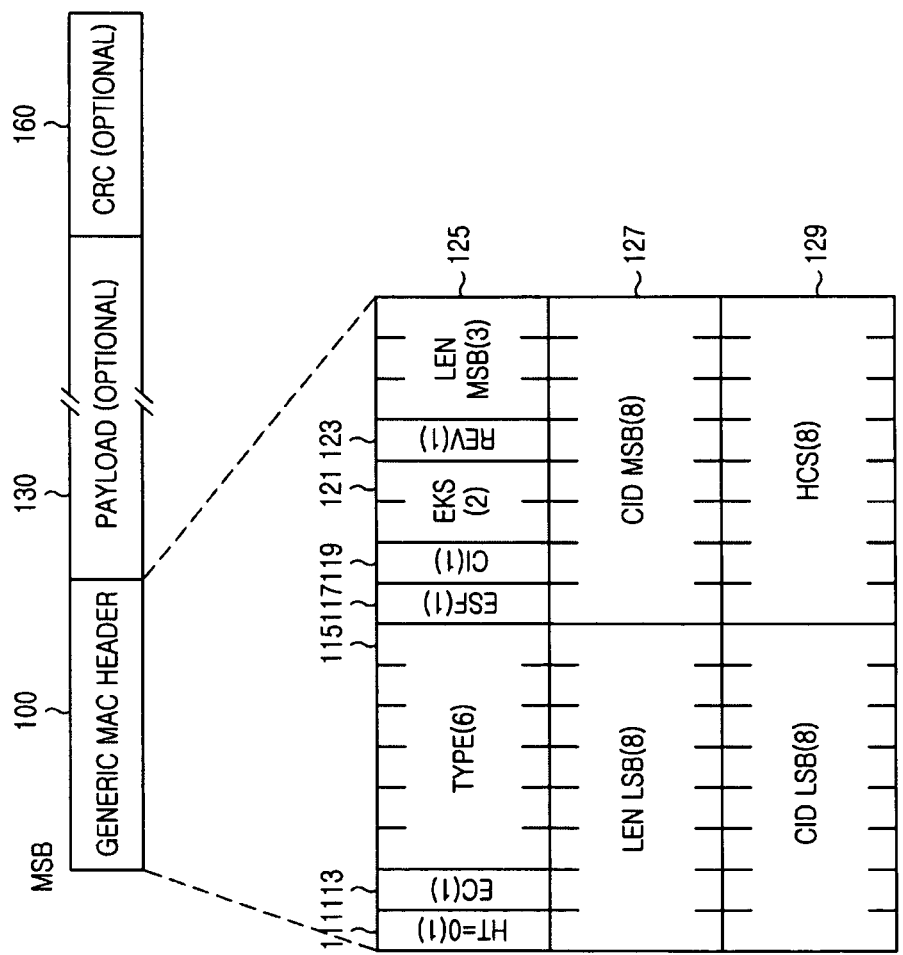
FIG. 1 illustrates an emergency service message format in a wireless communication system according to an exemplary embodiment of the present invention.

FIG. 1 illustrates an emergency service message format in a wireless communication system according to an exemplary embodiment of the present invention. The current IEEE 802.16e system does not describe the format or the transmission scheme of the emergency service message and transmission scheme. However, every Medium Access Control (MAC) message transmitted in the IEEE 802.16 system is in the form of a MAC Protocol Data Unit (PDU). Since the emergency service message belongs to the MAC message type, the form of the emergency service message is the MAC PDU as well. Naturally, the emergency service message of the present invention is in the form of the MAC PDU as shown in FIG. 1.

Referring to FIG. 1, the emergency service message includes a generic MAC header field 100 in front of a payload field 130, and a Cyclic Redundancy Checking (CRC) field 160 after the payload field 130.

The generic MAC header field 100 includes a Header Type (HT) field 111 indicative of a header type, an Encryption Control (EC) field 113 indicative of whether the payload field 130 is encrypted, a Type field 115 indicative of the type of a subheader in the emergency service message, an Extended Subheader Field (ESF) 117 indicative of whether the emergency service message includes the extended subheader, an CRC Indicator (CI) field 119 indicative of whether the emergency service message includes the CRC field 160, an Encryption Key Sequence (EKS) field 121 indicative of an index and an initial vector of a Traffic Encryption Key (TEK) used to encrypt the payload field 130, a Reserved (Rev) field 123 reserved for a non-specific purpose, a Length (LEN) field 125 indicative of the length of the emergency service message, a Connection IDentifier (CID) field 127 indicative of a CID of the emergency service message, and a Header Check Sequence (HCS) field 129 indicative of a header error check code used to detect error in the generic MAC header field 100.

Herein, the LEN field 125 indicative of the length of the emergency service message includes a LEN Most Significant Bits (MSB) field and a LEN Least Significant Bits (LSB) field. A combination of values of the LEN MSB field and the LEN LSB field represents the length of the emergency service message. Similarly, the CID field 127 includes a CID MSB field and a CID LSB field. A combination of values of the CID MSB field and the CID LSB field represents the CID of the emergency service message. Since the emergency service message of the present invention should be received at every Mobile Station (MS), the value of the CID field 127 is a broadcast CID. Herein, a number in the parenthesis of the HT field 111 to the HCS field 129 indicates the number of bits for the corresponding field. For example, as the '1' is recorded in the parenthesis of the HT field 111, the HT field 111 is implemented with 1 bit.

The payload field 130 includes an Emergency Message Body field.

The CID field 127 varies per system. That is, the CID used for the emergency service message transmission differs per a service provider of Base Stations (BSs) or per BS, or part of usable CIDs per BS may be allocated for the emergency service. In this case, the BS needs to provide information regarding with which CID the emergency service message is transmitted. For doing so, the present invention provides an emergency service CID TLV encoding of Table 1.

TABLE 1

| Name | Type (1 byte) | Length | Value(Variable Length) | PHY Scope |
|---|---|---|---|---|
| Emergency Service CID | XX | 2 | The CID in which Emergency Service message is transmitted. Default CID: 0x#### | All |

The emergency service CID TLY encoding of Table 1 is included in a Downlink Channel Descriptor (DCD) message broadcast to MSs of the BS. When the DCD message does not include the emergency service CID TLV encoding, the MSs of the BS consider that a default CID (0x####) is used in the emergency service message transmission. In contrast, the emergency service CID TLV encoding may be transmitted from the BS to the MS using a MAC management message used for a message negotiation in the process of the network entry, for example, using a SS Basic Capability-ReSPonse (SBC-RSP) message or a REGistration ReSPonse (REG-RSP) message, rather than the DCD message. After the DCD message reception or the message negotiation in the network entry process, the MS recognizes the CID used in the emergency service message transmission. Next, when the BS transmits the MAC PDU including the CID, the MS considers that a MAC Service Data Unit (SDU) of the MAC PDU includes the emergency service message. As such, upon determining that the MAC message received from the BS is the emergency service message, the MS does not process the message in the MAC layer even though the emergency service message is the MAC message, but forwards the message to an upper layer so that the message is processed in the upper layer.

In contrast, rather than the emergency service CID TLV encoding of Table 1, an emergency service CID having a fixed value may be defined and utilized. In this situation, it is possible to avoid overhead caused by including the CID in a message periodically transmitted such as DCD message, or to a MAC management message negotiated in the network entry process.

Meanwhile, the type of the emergency service may vary, and the emergency service message may be transmitted in the different CID. Accordingly, the BS needs to inform the MS of the CIDs used for the transmission of the multiple emergency service messages. To inform the MS of the CIDs, the Length field of Table 1 indicates, for example, that the length data produced by multiplying the number of the CIDs used in the emergency service by one CID length (i.e., 2) is recorded in the Value field. The Value field of Table 1 may be modified to arrange the CIDs used for the emergency service in succession.

When the emergency service message is too great for one MAC PDU or the amount of the available resource in the frame is too small, a single emergency service message may be split into a plurality of MAC PDUs. When the IEEE 802.16 system has to split the data received from the upper layer into the plurality of MAC PDUs, a fragmentation subheader of Table 2 is used.

TABLE 2

| Syntax | Size (bit) | Notes |
|---|---|---|
| Fragmentation Subheader( ){ | — | — |
| FC | 2 | Indicates the fragmentation state of the payload 00 = No fragmentation 01 = Last fragment 10 = First fragment |

TABLE 2-continued

| Syntax | Size (bit) | Notes |
|---|---|---|
| | | 11 = Continuing(middle) fragment |
| ... | ... | ... |

As shown in Table 2, the fragmentation subheader includes a Fragment Count (FC) field and other conventional fields. Herein, the FC field '00' implies that the data of the upper layer is transmitted in a single MAC PDU. In this case, there is no need to use the fragmentation subheader. Meanwhile, other FC field values imply that the upper layer data is split, that is, fragmented into the plurality of the MAC SDUs, the MAC PDUs are mapped to the MAC PDUs, and then the data is transmitted. To distinguish the MAC SDUs of the fragmented upper layer data, the fragmentation subheader is transmitted together with the MAC SDUs (i.e., the fragments). In the single upper layer data, FC=10 is used in the first MAC SDU, FC=11 is used for middle MAC SDUs, and FC=01 is used in the last MAC SDU.

The MS in the normal operation, which stays awake all the time, has no difficulty in receiving the corresponding emergency service message even when the emergency service message is fragmented. However, the idle MS or the sleeping MS requires information relating to the transmission time of the emergency service message, that is, the information relating to the wake-up time of the MS. Such information may be provided to the MS using a Broadcast Control Pointer IE. More specifically, the BS transmits the DL-MAP message including the Broadcast Control Pointer IE to the idle MS during a paging listening interval in which the corresponding MS is awake and to the sleeping MS during a listening window in which the corresponding MS is awake. The MS, receiving the message, may acquire the transmission time of the emergency service message and receive the emergency service message by waking up in the frame of the corresponding time point.

The message informs of the transmission time of the emergency service message but does not inform of how many emergency service messages are received at the MS or how long the MS needs to wait for the reception. Thus, the following two cases are considered.

First, as stated earlier, one emergency service message may be fragmented into a plurality of MAC PDUs. The sleeping or idle MS wakes up in the corresponding frame indicated by the Broadcast Control Pointer IE and waits to receive the MAC PDUs of the emergency service message. When the received MAC PDU includes not only the MAC SDU but also the fragmentation subheader, the MS may recognize that the relevant emergency service message is fragmented. In this case, the MS should keep awake until all of the MAC PDUs of the emergency service message are received. When the reception of all the MAC PDUs is completed within the listening window in which the sleeping MS is awake or within the paging listening interval in which the idle MS is awake, the corresponding MS performs operations in the listening window or the paging listening interval. In contrast, when the reception of all the MAC PDUs is completed outside the listening window of the sleep mode or the paging listening interval of the idle mode, the corresponding MS returns to the idle mode or the sleep mode.

Second, the BS may schedule a plurality of emergency service messages and transmit the emergency service messages to the MS at similar times. When the sleeping and idle MS wakes up in the frame indicated by the Broadcast Control Pointer IE and waits to receive the emergency service messages, it does not know how many successive emergency service messages are transmitted from the BS. Upon completing the reception of the first emergency service message, the MS may return to the idle mode or the sleep mode. To prevent this, the format of the Broadcast Control Pointer IE message is suggested as shown in Table 3.

TABLE 3

| Syntax | Size (bit) | Notes |
|---|---|---|
| Broadcast_Control_Pointer_IE( ) | — | — |
| { | | |
|   Extended DIUC | 4 | Broadcast_Control_Pointer_IE( ) = 0x0A |
|   Length | 4 | Length in bytes |
|   DCD_UCD Transmission Frame | 7 | The most significant bits of the frame number's least 9 significant bits of the next DCD and/or UCD transmission. |
|   Skip Broadcast_System_Update | 1 | — |
|   If (Skip Broadcast_System_Update == 0) { | — | — |
|     Broadcast_System_Update_Type | 1 | Shows the type of Broadcast_System_Update 0: For MOB_NBR-ADV Update 1: For Emergency Services Message |
|     Broadcast_System_Update_Transmission_Frame | 7 | The least significant bits of the frame number of the next Broadcast_System_Update transmission. |
|     Number of Emergency Service Messages | 8 | Valid only when Broadcast_System_Update_Type = 1. Indicates the number of Emergency Service Messages to be transmitted from the DCD_UCD Transmission Frame |
|   } | — | — |
| } | | |

The Extended Downlink Interval Usage Code (DIUC) indicates a code used to distinguish the IE message contained in the DL-MAP message, and a code used to distinguish the Broadcast Control Pointer IE message is '0x0A' as shown in Table 3. The Length indicates the length of the Broadcast Control Pointer IE message, and the DCD_Uplink Channel Descriptor (UCD) Transmission Frame indicates the frame of the next DCD message and UCD message. Of the LSB 9 bits of the frame number of the next DCD message and UCD message, the MSB 7 bits are used as the value of the DCD_UCD Transmission Frame. In so doing, the corresponding broadcast message (i.e., the DCD message and the UCD message) is transmitted within 4 frames from the frame specified by the DCD_UCD Transmission Frame. The Broadcast Control Pointer IE message may be used to indicate the transmission time of the MOB_NBR-ADV message or the emergency service message. The Skip Broadcast_System_Update indicates whether the transmission time information of the emergency service message is omitted. For example, the Skip Broadcast_System_Update value '0' may imply the non-omission of the transmission time information of the MOB_NBR-ADV message or the emergency service message. As such, when the transmission time information of the MOB_NBR-ADV message or the emergency service message is not omitted, Broadcast_System_Update_Type indicative of the transmission of either the MOB_NBR-ADV message or the emergency service message and Broadcast_System_Update_Transmission_Frame indicative of the transmission time of the transmitted message are included. For instance, the Broadcast_System_Update_Type value '0' implies the transmission of the MOB_NBR-ADV message and the value '1' implies the transmission of the emergency service message. In so doing, the Broadcast_System_Update_Transmission_Frame indicates the LSB of the frame number which carries the corresponding message matching the Broadcast_System_Update_Type value. Number of Emergency Service Messages added in this exemplary embodiment of the present invention indicates the number of emergency service messages for the idle or sleeping MS to wake up and receive in the frame specified by the Broadcast_System_Update_Transmission_Frame. Herein, when the reception of all the emergency service messages finishes within the listening window of the sleep mode or the paging listening interval of the idle mode, the MS performs the operation in the listening window or the paging listening interval. In contrast, when the reception of all the emergency service messages finishes outside the listening window of the sleep mode or the paging listening interval of the idle mode, the MS returns to the idle mode or the sleep mode. In the meantime, under a poor channel condition, the MS may not receive all of the messages. In this situation, the MS keeps waiting to receive the number of emergency service messages equal to the number of corresponding emergency service messages. To avoid this, when a corresponding time passes, the MS should return to the idle mode or the sleep mode as aforementioned. The waiting time may be determined by the basic waiting time (a preset value)×the number of the emergency service messages.

Those two cases may happen at the same time. That is, during the waiting time for the reception of the emergency service message, the multiple emergency service messages may be transmitted with all or part of them fragmented.

The current IEEE 802.16 system defines a Multicast and Broadcast Service (MBS) standard for providing the MBS to a plurality of MSs. Unlike the conventional unicast service, the MBS may enhance the reception performance of the MS in a manner that the BSs transmit substantially the same broadcasting contents at the same time in the same frequency and the MS combines and utilizes the packets received from the BSs. This effect is referred to as a macro diversity gain.

In the conventional broadcast wireless communication system, a DL frame structure for the MBS is now explained.

To support the macro diversity, the BSs define part of the frame as an MBS region and transmit MBS data bursts over the MBS region. The location of the MBS region is delivered in a DL-MAP message. The DL-MAP message includes MBS_MAP_IE. The MBS_MAP_IE includes location information of the MBS-MAP message including allocation information of the MBS data bursts. Hence, the MS may locate the MBS-MAP message based on the DL-MAP message, locate and acquire the MBS region, the MBS data bursts of the MBS region and their coding information based on the MBS-MAP message, and thus receive the MBS data bursts. The emergency service message may be delivered through the MBS. In this case, the emergency service message transmitted in the MBS region uses a Multicast CID (MCID).

When the BS informs of the CID used for the emergency service using the DCD message and the CID includes the MCID, this implies that the BS may send the emergency service message in the MBS region, rather than the normal zone. When the CID includes the MCID, the MS needs to determine whether the emergency service message is transmitted in the MBS region by decoding not only the DL-MAP message but also the MBS-MAP message per frame. Upon identifying the burst including the MCID by decoding the MBS-MAP message, the MS needs to extract and receive the emergency service message by decoding the corresponding MBS burst in the MBS region.

However, since the emergency service message is not transmitted frequently, it is not preferable to decode every MBS-MAP message. In other words, as the MS does not know when the emergency service message is transmitted, it tries to decode the MBS-MAP message in every frame. Since the emergency service message is sent not in every frame, the unnecessary MBS-MAP message decoding causes unnecessary power consumption and the waste of processing resource of the MS. Thus, when the emergency service message is transmitted in the MBS region, the BS should send the Broadcast Control Pointer IE including the transmission time of the emergency service message. The MS may receive the emergency service message by decoding the MBS-MAP message only in the frame designated by the Broadcast Control Pointer IE. That is, in the other frames than the frame indicated by the Broadcast Control Pointer IE, the waking MS does not have to decode the MBS-MAP message.

To prevent the MS from unnecessarily decoding the MBS-MAP message, a new parameter, that is, an Existence of Emergency Service Message in MBS region parameter is further included in the MBS_MAP_IE as shown in Table 4. When receiving the MBS-MAP IE contained in the DL-MAP message, the MS confirms the Existence of Emergency Service Message in MBS region field. When the field is '1', it implies the transmission of the emergency service message in the MBS region. Hence, the MS decodes the MBS-MAP message to acquire the location/size of the emergency service message.

TABLE 4

| Syntax | size (bits) | Notes |
|---|---|---|
| MBS_MAP_IE( ) { | | |
| Extended DIUC | 4 | MBS_MAP = 0x0A |
| ... | ... | ... |
| Macro diversity enhanced | 1 | 0 = Non Macro diversity enhanced zone<br>1 = Macro diversity enhanced zone |
| If (Macro diversity enhanced=1) { | | |
| Existence of Emergency | 1 | 0: Indicates no existence of Emergency |

TABLE 4-continued

| Syntax | size (bits) | Notes |
|---|---|---|
| Service Message in MBS region | | Service Message in a MBS region<br>1: Indicates existence of Emergency Service Message in the MBS region |
| Reserved | 3 | |
| ... | ... | ... |
| } | | |

The Macro diversity enhanced indicates whether there is the MBS region in the DL zone.

While an exemplary method for the BS to inform the MS of the CID used for the emergency service message transmission and to inform the idle and sleeping MS of the information relating to the transmission time of the emergency service message and the number of the emergency service messages using the Broadcast Control Pointer IE message has been illustrated, the BS may send the emergency service message in the paging listening interval in which the idle MS is awake or in the listening window interval in which the sleeping MS is awake, without using the Broadcast Control Pointer IE. In this case, to send the plurality of the emergency service messages, the BS should schedule all the emergency service messages to send them before the paging listening interval or the listening window interval ends.

In the Broadcast Control Pointer IE message of Table 3, the frame offset indicated by the Broadcast_System_Update_Transmission_Frame is 127 frames at maximum, whereas the time duration for which the idle MS sustains the idle mode, that is, the paging cycle is 16 bits or 65,535 frames. The maximum value of the time duration for which the sleeping MS sustains the sleep mode, that is, the sleep window is 1,024 frames. In conclusion, when the BS informs of the reception time of the emergency service message in the paging listening interval or the listening window of the MS through the Broadcast Control Pointer IE message, in the worst case, for the delivery of the emergency service message, the Broadcast Control Pointer IE should be transmitted for 8 times at maximum in the sleep mode and for 516 times at maximum in the idle mode. For example, to send the emergency service message to the idle MS (its paging cycle is 5,000 frames) which stays awake in the paging listening interval, after 127 frames, the BS sends to the corresponding MS the Broadcast Control Pointer IE message informing of the emergency service message transmission time (after 127 frames). The MS transits to the idle mode at the end of the paging listening interval, wakes up after 127 frames, and then waits to receive the emergency service message. The BS transmits substantially the same Broadcast Control Pointer IE, and the MS receives the Broadcast Control Pointer IE, transits to the idle mode, wakes up after the last 127 frames, and then repeats the above operation. Eventually, the idle MS receives the Broadcast Control Pointer IE for 10 times, wakes up after 127 frames, and receives the emergency service message. Such operations waste the power and air resources. Therefore, a new Broadcast Control Pointer IE message is required to accommodate the paging cycle of the idle MS and the listening window of the sleeping MS at a time.

To this end, the format of the Extended Broadcast Control Pointer IE message is provided as shown in Table 5.

TABLE 5

| Syntax | Size (bit) | Notes |
|---|---|---|
| Extended_Broadcast_Control_Pointer_IE( ) | — | — |
| { | | |
| Extended DIUC | 4 | Broadcast_Control_Pointer_IE( ) = 0x0E |
| Type | 2 | 00: Emergency Service Message<br>01~11: Reserved |
| Number of Emergency Service Messages | 2 | Valid only when Type = 00.<br>Indicates the number of Emergency Service Messages to be transmitted from the DCD_UCD Transmission Frame |
| Transmission Frame | 16 | Least significant 16 bits of frame number in which Emergency message is broadcasted |
| Frame Duration | | Indicates the period during which an MS in Idle Mode or Sleep Mode shall keep awake to receive emergency service message(s). The value '0' indicates the only Transmission Frame. Its unit is frame. |
| } | — | |

The Extended DIUC indicates a code used to distinguish the IE message contained in the DL-MAP message, and a code used to distinguish the Broadcast Control Pointer IE message is '0x0E'. The Type indicates the message type to be delivered in the frame indicated by the Transmission Frame field, and the Number of Emergency Service Messages indicates the number of emergency service messages to be delivered from the time point indicated by the Transmission Frame field. The Transmission Frame is used to indicate the transmission time of the message type indicated by the Type. The LSB 16 bits of 24 bits representing the frame number are recorded as the value of the Transmission Frame. The Frame Duration indicates the waiting time of the MS to receive the emergency service messages after waking up at the time point indicated by the Transmission Frame field. When the waiting time passes by, the MS needs to return to the idle mode or the sleep mode as mentioned earlier.

Herein, when the Extended Broadcast Control Pointer IE message of Table 5 is used, both of the paging cycle of the idle mode and the sleep window of the sleep mode may be covered by the single Extended Broadcast Control Pointer IE message.

In this exemplary embodiment of the present invention, the CID used for the emergency service message is included in the DCD message in the form of the single TLV and transmitted to the MS. However, other information than the CID may be necessary. The priority of the emergency service message and information relating to a Convergence Sublayer (CS) for processing the emergency service message when the emergency service message is transmitted may be further required per emergency service message in addition to the CID. The DCD message may further include information besides the CID. That is, different constitutions per emergency service message may be realized and the information relating to the plurality of the emergency service messages may be delivered by the DCD message. For example, when the BS utilizes four emergency services, four emergency service compound TLVs are delivered by the DCD message. Each individual emergency service compound TLV includes a sub TLV having the different value from the parameter of the other emergency service compound TLVs.

The format of the DCD message includes the emergency service compound TLV as shown in Table 6.

TABLE 6

| Name | Type (1 byte) | Length | Value(Variable Length) | PHY Scope |
|---|---|---|---|---|
| Emergency Service | 63 | | The Emergency Service is a compound TLV that defines the parameters required for Emergency Service Multiple instances may be included in DCD message. But, only one Emergency Service compound TLV shall be included in DCD message for a specific priority. | |

In Table 6, as many emergency service compound TLVs as the types of the emergency service message sent by the BS may be contained in the DCD message. Herein, the emergency service compound TLV may include parameters as shown in Table 7.

TABLE 7

| Name | Size (1 byte) | Length | Value(Variable Length) |
|---|---|---|---|
| CID for Emergency Service | 63.1 | 2 | Multicast CID used for DL Emergency Service.<br>Emergency Service message shall be transmitted on this connections |
| Information for Emergency Service | 63.2 | 1 | If this TLV is omitted, MS shall consider that Emergency Service message on the CID specified by CID for Emergency Service (i.e. Type = 63.1) has the default priority and CS type.<br>Bit #0-3 indicates the priority of Emergency service message that is transmitted on the connection.<br>Lower value has higher priority. That is, the priority 0 is the highest priority (default) and the priority 7 is the lowest priority<br>Bit #4-7 indicates CS type which is used for Emergency Service.<br>0. GPCS<br>1. Packet, IPv4 (default)<br>2. Packet, IPv6<br>3. Packet, IEEE802.3/Ethernet<br>4. Packet, IPv4 over IEEE 802.3/Ethernet<br>5. Packet, IPv6 over IEEE 802.3/Ethernet<br>7. ATM<br>8-15: Reserved |

The CID for Emergency Service indicates the CID for sending the corresponding emergency service message. The Information for Emergency Service indicates the priority and the CS type of the corresponding emergency service message. The MS is given its own priority, and the priority of the MS is set to a value of the provider. When there is the emergency service message of the higher priority (the lower value) than the priority of the MS, the MS must receive the emergency service message. As for the emergency service message having lower priority (the higher value) than its priority, the MS may not receive the emergency service message or may disregard the received emergency service message. Herein, the CS type indicates the CS for processing the MAC PDU including the corresponding emergency service message.

The format of the Extended Broadcast Control Pointer IE message stated above may be constituted as shown in Table 8.

messages multiple times. To avoid the repetitive receptions, the BS transmits the Extended Broadcast Control Pointer IE message of Table 8 including Counter for the ESM. The Counter for the ESM indicates the transmission number of the emergency service message. The Counter for the ESM differs per the emergency service message. When sending a new emergency service message after the repetitive transmission of the same emergency service message, the BS increases the Counter for the ESM of the previous emergency service message transmission by '1'. The MS stores the Counter for the ESM. Receiving a Counter for the ESM that is different from its stored Counter for the ESM signifies the delivery of the new emergency service message, and the MS receives the corresponding emergency service message and then stores the new Counter for the ESM. When the BS repeatedly sends substantially the same emergency service message, the

TABLE 8

| Syntax | Size (bit) | Notes |
| --- | --- | --- |
| Extended Broadcast_Control_Pointer_IE( ) { | — | — |
|   Extended DIUC | 4 | Extended Broadcast_Control_Pointer_IE( ) = 0x0E |
|   Type | 4 | Indicates the type of message. 0x0: Emergency Service Message 0x1~0xF: Reserved |
|   Transmission Frame Offset | 16 | A relative value from the current frame number in which a BS will start to transmit Emergency Service Message. '0' means the current frame in which this MAP IE is transmitted. |
|   Transmission Duration | 8 | Indicates the period during which an MS in Idle Mode or Sleep Mode shall keep awake to receive emergency service message(s). The value '0' indicates that the MS keeps awake during only Transmission Frame. Its unit is frame. |
|   if(Type == 0x0) { | — | — |
|     Transmission of ESM with priority | 8 | Indicates which ESM with specific priority will be transmitted in the frame specified by TransmissionFrameOffset Bit #0: if set to 1, ESM with the priority 0 will be transmitted. Bit #1: if set to 1, ESM with the priority 1 will be transmitted. Bit #2: if set to 1, ESM with the priority 2 will be transmitted. Bit #3: if set to 1, ESM with the priority 3 will be transmitted. Bit #4: if set to 1, ESM with the priority 4 will be transmitted. Bit #5: if set to 1, ESM with the priority 5 will be transmitted. Bit #6: if set to 1, ESM with the priority 6 will be transmitted. Bit #7: if set to 1, ESM with the priority 7 will be transmitted. |
|     While (the bit in Transmission of ESM with priority == 1) { | — | — |
|       Counter for the ESM | 8 | This field is used to prevent MSs from unnecessarily decoding the ESMs retransmitted by BS. |
|     } | — | |
|   } | — | |
| } | — | |

The BS is able to transmit substantially the same emergency service message multiple times so that every MS may be fully aware of the emergency (because the MS may not receive the emergency service message). In this situation, the MS may receive substantially the same emergency service messages multiple times. Counter for the ESM of the repeatedly received emergency service messages is equal to the Counter for the ESM pre-stored in the MS. Hence, the MS does not redundantly receive the emergency service messages. Upon receiving a Counter for the ESM that is different from the stored value, the MS may recognize that a new emergency service message will be received.

In the frame specified by the Extended Broadcast Control Pointer IE of Table 8, Transmission of ESM with Priority indicates the priority of the emergency service message to be sent in Transmission Duration. As described above, the MS must receive the emergency service message of the higher priority than its own priority, and may not receive the emergency service message having a lower priority than its priority. In a case where only emergency service messages of the lower priority than the priority of the MS are to be transmitted, the MS may not receive the messages by ignoring them. If necessary, the MS may receive the messages. In spite of the emergency service message of the low priority, the Counter for the ESM of the emergency service message needs to be updated.

Herein, the Extended Broadcast Control Pointer IE must be included in the DL MAP message prior to the transmission so as to inform the idle and sleeping MSs of the transmission time of the emergency service message in advance, and to avoid the selective emergency service message reception and the retransmitted emergency service message reception of every MS.

Figure 2:
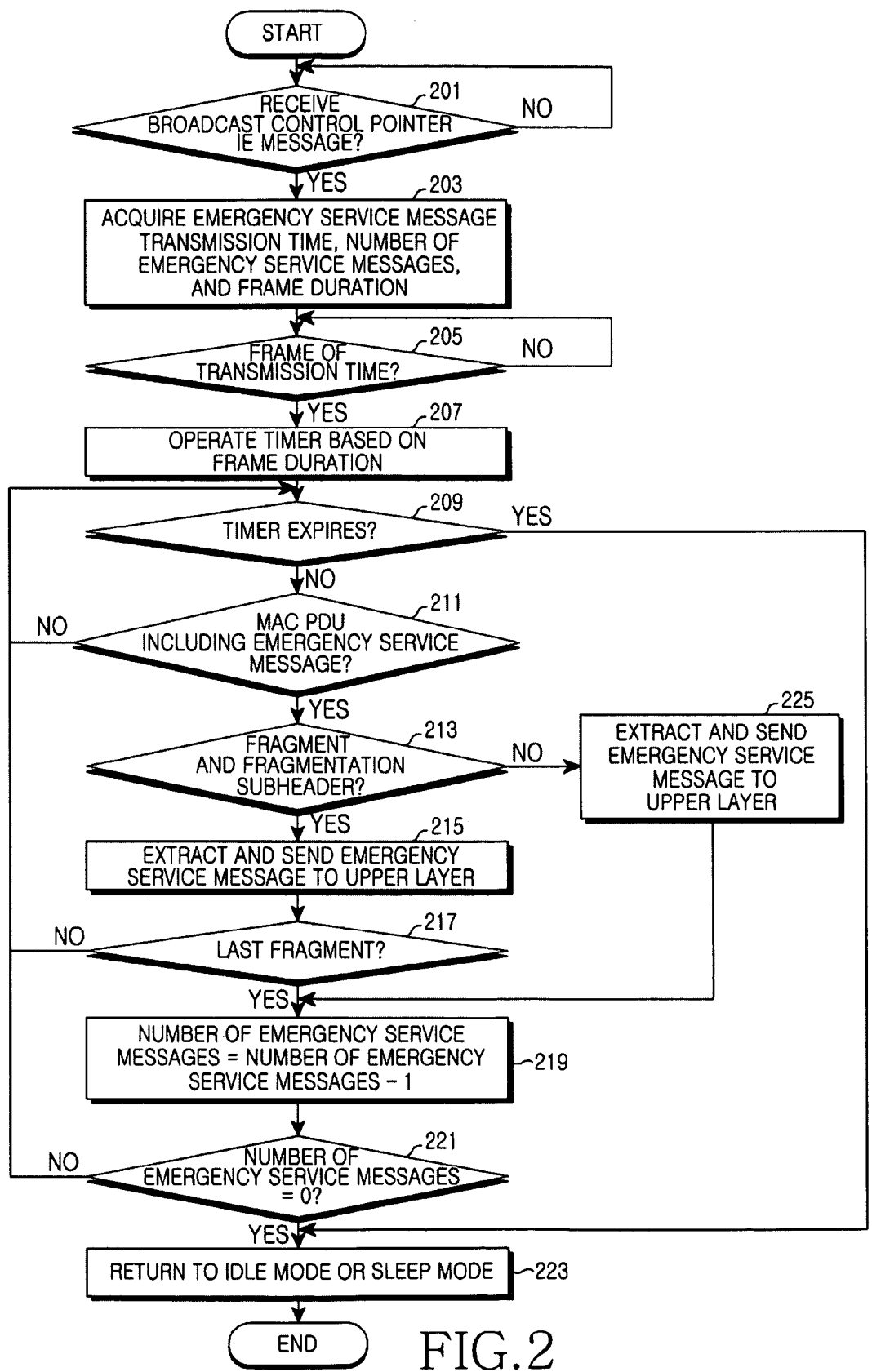
FIG. 2 is a flowchart illustrating a method for receiving an emergency service message at an idle and sleeping Mobile Station (MS) in a wireless communication system according to an exemplary embodiment of the present invention.

FIG. 2 is a flowchart illustrating a method for receiving an emergency service message at an idle and sleeping MS in a wireless communication system according to an exemplary embodiment of the present invention.

In step 201, the MS determines whether the Broadcast Control Pointer IE message of Table 3 is received from the BS. Herein, rather than the Broadcast Control Pointer IE message, the Extended Broadcast Control Pointer IE message of Table 5 or Table 8 may be used. The Broadcast Control Pointer IE message or the Extended Broadcast Control Pointer IE message is received in the DL-MAP message.

When receiving the Broadcast Control Pointer IE message, the MS acquires information relating to the emergency service message transmission time, the number of emergency service messages, and the frame duration using the received Broadcast Control Pointer IE message in step 203. Herein, the idle MS receives the Broadcast Control Pointer IE message in the paging listening interval, and the sleeping MS receives the Broadcast Control Pointer IE message in the listening window. At the end of the paging listening interval or the listening window, the MS transits to the idle mode or the sleep mode. Herein, the frame duration is the waiting time of the MS from the emergency service message transmission time to receive the emergency service message. When the MS receives the Broadcast Control Pointer IE message of Table 3, the frame duration is determined by the basic waiting time (a preset value)×the number of the emergency service messages. When the Extended Broadcast Control Pointer IE message of Table 5 or Table 8 is received, the frame duration may be acquired by extracting the information relating to the frame duration in the corresponding Extended Broadcast Control Pointer IE message.

In step 205, the MS determines whether the current frame is the frame of the emergency service message transmission time point using the acquired information relating to the emergency service message transmission time. Step 205 is repeated until the current frame reaches the frame of the emergency service message transmission time point.

When the current frame is the frame of the emergency service message transmission time point, the MS transits from the idle mode or the sleep mode to the normal operation mode and operates a timer based on the acquired frame duration in step 207, and determines whether the timer is expired in step 209. When the timer expires in step 209, the MS returns to the idle mode or the sleep mode in step 223.

When the timer does not expire in step 209, the MS determines whether there is a MAC PDU including the emergency service message in the corresponding frame in step 211. That is, the MS determines whether the MAC PDU including the emergency service CID is included in the corresponding frame. When the emergency service CID employs the MCID, the emergency service message may be delivered in the MBS region. Accordingly, the MS receives the MBS_MAP IE in the DL-MAP message and determines the setting of the field in the received MBS_MAP IE. When the field setting indicates the existence of the emergency service message to be sent in the MBS region, the MS needs to decode the MBS-MAP message as well. Herein, the field indicates the presence or absence of the emergency service message to be sent in the MBS region. The MS may acquire the allocation information of the MBS bursts by decoding the MBS MAP message and receive the emergency service message by decoding the MBS bursts in the MBS region using the acquired allocation information. At this time, the MBS bursts include the MCID pre-allocated for the transmission of the emergency service message. Thus, the MS may receive the emergency service message in the general zone or the MBS region. Herein, the emergency service CID may employ the fixed-value emergency service CID, or may be acquired by receiving the emergency service CID TLV encoding of Table 1 or the emergency service compound TLV of Table 7 from the BS. The emergency service CID TLV encoding of Table 1 or the emergency service compound TLV of Table 7 is delivered to the MS by the DCD message or the MAC management message used for the message negotiation in the network entry process. Herein, besides the CID used for the emergency service message transmission, the DCD message may further include the type of the CS for processing the emergency service message and the information as to the priority of the emergency service message. Receiving the emergency service message including the CID, the MS may process the received emergency service message through the corresponding CS. In a case where the DCD message does not contain information of the type of the CS for processing the emergency service message, the MS may process the received emergency service message through the default CS.

When there is no MAC PDU including the emergency service message in the corresponding frame in step 211, the MS returns to step 209. When there is the MAC PDU including the emergency service message in the corresponding frame in step 211, the MS determines whether there is a fragment (MAC SDU) of the emergency service message and the fragmentation subheader for the corresponding fragment in the MAC PDU in step 213. The fragmentation subheader may be constituted as shown in Table 2.

When there are the fragment of the emergency service message and the fragmentation subheader for the corresponding fragment in the MAC PDU in step 213, the MS extracts the corresponding emergency service message from the MAC PDU and sends the extracted emergency service message to the upper layer in step 215 and determines whether the corresponding fragment is the last fragment in step 217. Whether the fragment is the last fragment may be determined using the fragmentation subheader. When the fragment is the last fragment, the MS advances to step 219. When the fragment is not the last fragment, the MS recognizes the existence of the fragment not yet received from the corresponding emergency service message and returns to step 209. Meanwhile, when it is determined that there is no fragment of the emergency service message and no fragmentation subheader for the corresponding fragment in the MAC PDU in step 213, that is, when there exists only the emergency service message not fragmented, the MS extracts the corresponding emergency service message from the MAC PDU and sends the extracted emergency service message to the upper layer in step 225 and then proceeds to step 219.

The MS subtracts '1' from the number of the emergency service messages in step 219 and determines whether the number of the subtracted emergency service messages is zero in step 221. When the number of the subtracted emergency service messages is zero, the MS determines the reception of all of the corresponding emergency service messages and returns to the idle mode or the sleep mode in step 223. More specifically, when the reception of all the corresponding emergency service messages or the expiration of the timer falls within the listening window of the sleep mode or the paging listening interval of the idle mode, the MS carries out the operation in the listening window or the paging listening interval. In contrast, when the reception of all the corresponding emergency service messages or the expiration of the timer falls outside the listening window of the sleep mode or the paging listening interval of the idle mode, the MS returns to the idle mode or the sleep mode. Meanwhile, when the number of the subtracted emergency service messages is not zero, the MS determines the existence of the emergency service message not yet received in the corresponding frame and returns to step 209.

Next, the MS finishes this process.

Figure 3:
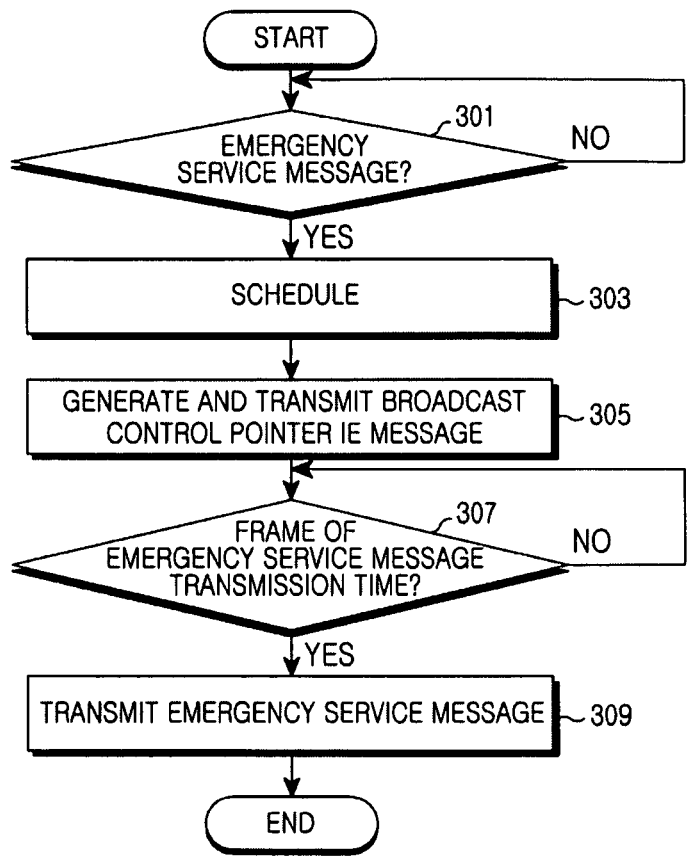
FIG. 3 is a flowchart illustrating a method for transmitting an emergency service message at a Base Station (BS) in a wireless communication system according to an exemplary embodiment of the present invention.

FIG. 3 is a flowchart illustrating a method for transmitting an emergency service message at a BS in a wireless communication system according to an exemplary embodiment of the present invention.

In step 301, the BS determines whether there is an emergency service message to be sent to the MS. When there is the emergency service message, the BS schedules the transmission of the emergency service message in step 303. For example, the BS determines the transmission time of the emergency service message and the waiting time (i.e., frame duration) of the MS to receive the emergency service message at the determined time. In step 305, the BS generates and transmits to the MS the Broadcast Control Pointer IE message including the information relating to the emergency service message transmission time, the number of the emergency service messages, and the frame duration. Herein, the Broadcast Control Pointer IE message may be constituted as shown in Table 3, and, rather than the Broadcast Control Pointer IE message, the Extended Broadcast Control Pointer IE message of Table 5 or Table 8 may be utilized. When the information of the frame duration is omitted as in the Broadcast Control Pointer IE message of Table 3, the MS is able to acquire the frame duration by determining the basic waiting time (a preset value)×the number of the emergency service messages. The Broadcast Control Pointer IE message or the Extended Broadcast Control Pointer IE message may be delivered by the DL-MAP message. The Broadcast Control Pointer IE message is transmitted to the corresponding MS in the paging listening interval of the idle MS or the listening window of the sleeping MS.

In step 307, the BS determines whether the current frame is the frame of the emergency service message transmission time. Step 307 is repeated until the current frame reaches the frame of the emergency service message transmission time. When the current frame is the frame of the emergency service message transmission time, the BS transmits the corresponding emergency service message to the corresponding MS in step 309.

Next, the BS finishes this process.

When it is determined that there is an emergency service message in step 301, the BS may transmit the corresponding emergency service message to the MS right away or after a time. In FIG. 3, the emergency service message is transmitted after some time. When the emergency service message is transmitted immediately in the MBS region, it is necessary to send the Broadcast Control Pointer IE message including the information relating to the emergency service message transmission time. In contrast, in the immediate transmission, the MBS_MAP_IE, rather than the Broadcast Control Pointer IE message, may be transmitted.

Although it is not illustrated in FIG. 3, for the delivery of the emergency service message, the BS may allocate the CID used for the transmission of the emergency service message, determine the CS type for processing the emergency service message, generate the DCD message including at least one of the allocated CID and the determined CS type information, and transmit the generated DCD message to the MS. Herein, when determining the CS type for processing the emergency service message to the default CS type, the BS may include only the allocated CID to the DCD message. The BS may further include the information relating to the priority of the emergency service message to the DCD message.

Although it is not illustrated, as part of sending the emergency service message in the MBS region in FIG. 3, the BS may determine whether there is the emergency service message to be sent in the MBS region, define the field in the MBS_MAP IE according to the determination, and send the DL-MAP message including the MBS_MAP IE with the defined field to the MS. Herein, the field indicates the presence or absence of the emergency service message to transmit in the MBS region. The emergency service message includes the pre-allocated MCID for its transmission.

Figure 4:
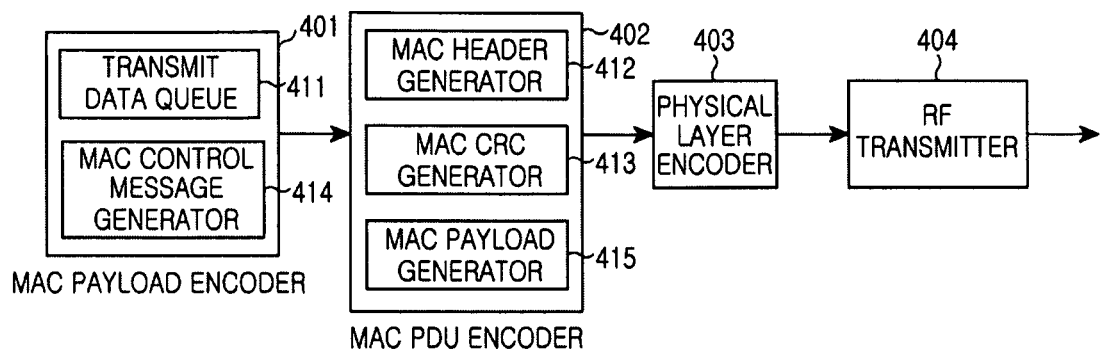
FIG. 4 is a block diagram illustrating a transmitting apparatus of a BS in a wireless communication system according to an exemplary embodiment of the present invention.

FIG. 4 is a block diagram illustrating a transmitting apparatus of a BS in a wireless communication system according to an exemplary embodiment of the present invention.

Referring to FIG. 4, the BS of includes a MAC payload encoder 401, a MAC PDU encoder 402, a physical layer encoder 403, and a Radio Frequency (RF) transmitter 404.

The MAC payload encoder 401 includes a transmit data queue 411 and a MAC control message generator 414. The transmit data queue 411 stores data from the upper layer and outputs the data to be sent in the corresponding frame to the MAC PDU encoder 402 according to the scheduling. In this exemplary embodiment of the present invention, the transmit data queue 411 outputs one or more emergency service messages to transmit in the corresponding frame according to the scheduling, to the MAC PDU encoder 402. Herein, all or some of the one or more emergency service messages may be fragmented and output to the MAC PDU encoder 402. The MAC control message generator 414 generates and outputs a MAC control message to the MAC PDU encoder 402. Herein, the MAC control message may include the DL-MAP message including the information of the data to transmit in the corresponding frame according to the scheduling, the DCD message, the MAC management message, and so forth. In this illustrated example, the DL-MAP message includes the Broadcast Control Pointer IE message of Table 3 or the Extended Broadcast Control Pointer IE message of Table 5 or Table 8. The Broadcast Control Pointer IE message or the Extended Broadcast Control Pointer IE message includes information relating to the emergency service message transmission time, the number of the emergency service messages, and the frame duration. For doing so, the MAC control message generator 414 may determine the transmission time of the emergency service message, and the waiting time for the MS to receive the emergency service message at the determined time. The DCD message or the MAC management message may include the emergency service CID TLV encoding of Table 1 or the emergency service compound TLV of Table 7. For doing so, the MAC control message generator 414 may allocate the CID used for the delivery of the emergency service message and determine the CS type for processing the emergency service message. The MAC control message generator 414 determines whether there exists the emergency service message to transmit in the MBS region. The MAC control message generator 414 may set the field in the MBS_MAP IE according to the determination and generate the DL-MAP message including the MBS_MAP IE with the set field as shown in Table 4. Herein, the field indicates the presence or the absence of the emergency service message to transmit in the MBS region.

The MAC PDU encoder 402 includes a MAC header generator 412, a MAC CRC generator 413, and a MAC payload generator 415. The MAC PDU encoder 402 generates a payload with the data output from the MAC payload encoder 401, generates the MAC PDU by attaching the header and the CRC to the generated payload, and outputs the generated MAC PDU to the physical layer encoder 403. In more detail, the MAC payload generator 415 generates the payload with the data (traffic) or the MAC control message output from the MAC payload encoder 401. When the MAC payload encoder 401 inputs the fragment of the emergency service message, the MAC payload generator 415 generates the fragmentation subheader for the corresponding fragment as shown in Table 2 and generates the payload including the fragment of the corresponding emergency service message and the fragmentation subheader. The MAC header generator 412 generates a header for the generated payload and prefixes the header to the corresponding payload. Herein, when the payload is generated using the emergency service message, the header contains the information relating to the CID 127 of the corresponding emergency service message as shown in FIG. 1. The MAC CRC generator 413 generates a CRC code for the generated payload and suffixes the generated CRC code to the corresponding payload. As such, the payload with the header and the CRC code attached is produced.

The physical layer encoder 403 encodes the MAC PDUs output from the MAC PDU encoder 402 in the physical layer. The physical layer encoder 403 may include a channel coding block, a modulation block, and so on. In an Orthogonal Frequency Division Multiplexing (OFDM) system, the channel coding block may include a channel encoder, an interleaver, and a modulator, and the modulation block may include an Inverse Fast Fourier Transform (IFFT) operator for loading the transmit data to a plurality of orthogonal subcarriers.

The RF transmitter 404 converts the baseband digital signal output from the physical layer encoder 403 to a baseband analog signal, converts the baseband analog signal to an RF signal, and transmits the RF signal over an antenna.

Figure 5:
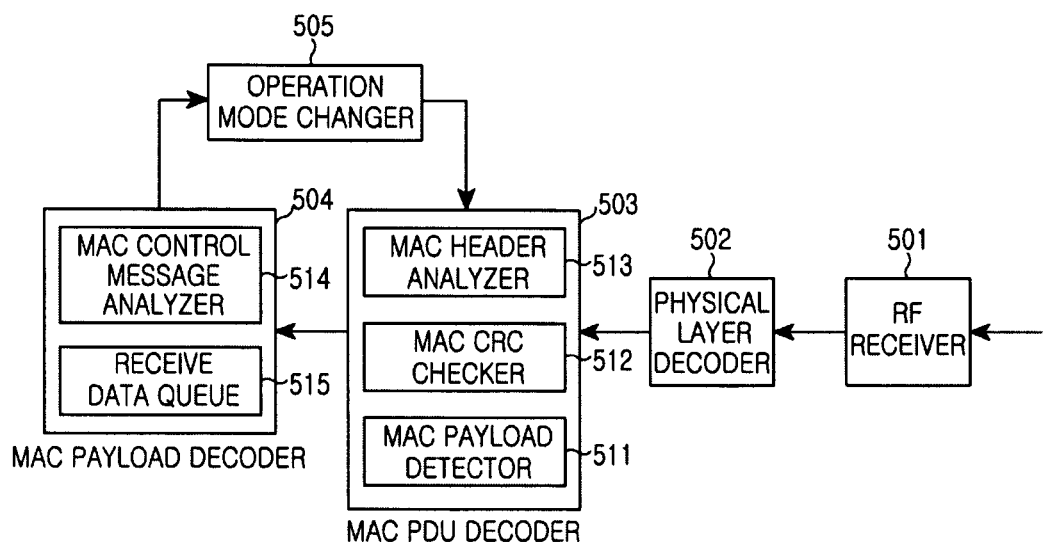
FIG. 5 is a block diagram illustrating a receiving apparatus of an MS in a wireless communication system according to an exemplary embodiment of the present invention.

FIG. 5 is a block diagram illustrating a receiving apparatus of an MS in a wireless communication system according to an exemplary embodiment of the present invention.

Referring to FIG. 5 the MS includes an RF receiver 501, a physical layer decoder 502, a MAC PDU decoder 503, a MAC payload decoder 504, and an operation mode changer 505.

The RF receiver 501 converts the RF signal received via an antenna to a baseband analog signal and converts the baseband analog signal to a baseband digital signal.

The physical layer decoder 502 outputs the original information data to the MAC PDU decoder 503 by decoding the baseband digital signal output from the RF receiver 501 in the physical layer. Herein, the physical layer decoder 502 may include a demodulation block, a channel decoding block, and so on. In the OFDM system, the demodulation block may include an FFT operator for extracting data from the subcarriers, and the channel decoding block may include a demodulator, a deinterleaver, and a channel decoder.

The MAC PDU decoder 503 includes a MAC header analyzer 513, a MAC CRC checker 512, and a MAC payload detector 511. The MAC PDU decoder 503 detects and analyzes the header from the MAC PDU output from the physical layer decoder 502, and checks the CRC. In further detail, the MAC header analyzer 513 determines whether the payload of the corresponding MAC PDU includes the control information or the traffic by analyzing the header of the MAC PDU, and outputs the payload of the MAC PDU to the MAC payload decoder 504 according to the determination. When the payload of the corresponding MAC PDU contains the control information, the payload of the MAC PDU is fed to a MAC control message analyzer 514 of the MAC payload decoder 504. When the payload contains the traffic, the payload of the MAC PDU is stacked in a receive data queue 515. In this exemplary embodiment, the MAC header analyzer 513 of the idle MS or the sleeping MS wakes up in the frame of the emergency service message transmission time under the control of the operation mode changer 505, determines whether the corresponding header includes the CID of the emergency service message by examining the header of the MAC PDU received during the operation of the timer, and outputs the determination to the operation mode changer 505. The MAC CRC checker 512 separates the CRC code from the MAC PDU output from the physical layer decoder 502, generates a CRC code with the payload of the MAC PDU, and checks for error by comparing the generated CRC code with the separated CRC code. The MAC CRC checker 512 controls the MAC payload detector 511 to provide the payload of the error-free MAC PDU to the MAC payload decoder 504. The MAC payload detector 511 detects the payload from the MAC PDU output from the physical layer decoder 502 and outputs the detected payload to the MAC payload decoder 504. In this exemplary embodiment, the MAC payload detector 511 of the idle MS or the sleeping MS wakes up in the frame of the emergency service message transmission time under the control of the operation mode changer 505, detects the payload from the MAC PDU of the CID for the emergency service message in the corresponding header among the MAC PDUs received during the operation of the timer, outputs the detected payload to the MAC payload decoder 504, and outputs the detection result to the operation mode changer 505. Herein, the detected payload may include one or more emergency service messages. When all or part of the one or more emergency service messages is fragmented, the detected payload may include the fragment of the corresponding emergency service message and the fragmentation subheader for the corresponding fragment.

The MAC payload decoder 504 includes the MAC control message analyzer 514 and the receive data queue 515. The MAC control message analyzer 514 analyzes the MAC control message output from the MAC PDU decoder 503, for example, the DL-MAP message, the DCD message, and the MAC management message. In this exemplary embodiment, the DL-MAP message may include the Broadcast Control Pointer IE message of Table 3 or the Extended Broadcast Control Pointer IE message of Table 5 or Table 8. The MAC control message analyzer 514 analyzes the Broadcast Control Pointer IE message or the Extended Broadcast Control Pointer IE message and outputs the information relating to the emergency service message transmission time, the number of the emergency service messages, and the frame duration to the operation mode changer 505. When the emergency service message is transmitted in the MBS region, the DL-MAP message may include the MBS_MAP IE with the defined field indicative of the presence or absence of the emergency service message to send in the MBS region as shown in Table 4. Hence, the MAC control message analyzer 514 analyzes the DL-MAP message and confirms the setting of the field in the MBS_MAP IE of the DL-MAP message. When the field setting indicates the existence of the emergency service message to send in the MBS region, the MBS-MAP message may be received and decoded. The MAC control message analyzer 514 may acquire the allocation information of the MBS burst by decoding the MBS MAP message, and may output the acquired allocation information to the operation mode changer 505. At this time, the MBS burst includes the MCID pre-allocated for the delivery of the emergency service message. The DCD message or the MAC management message may include the emergency service CID TLV encoding of Table 1 or the emergency service compound TLV of Table 7. By analyzing the emergency service CID TLV encoding or the emergency service compound TLV, the MAC control message analyzer 514 outputs the information of the CID of the emergency service message to the operation mode changer 505. The MAC control information analyzer 514 may acquire the information as to the type of the CS for processing the emergency service message by analyzing the emergency service compound TLV, and provide the acquired CS type information to the receive data queue 515. The receive data queue 515 buffers the receive data from the MAC PDU decoder 503 and provides the data to the upper layer. Particularly, the receive data queue 515 provides the emergency service message from the MAC PDU decoder 503 to the upper layer. Herein, the upper layer may be determined by the information as to the type of the CS for processing the emergency service message.

The operation mode changer 505 receives the information relating to the emergency service message transmission time, the number of the emergency service messages, the frame duration, and the CID of the emergency service message from the MAC control message analyzer 514, and changes the idle mode or the sleep mode to the normal operation mode in the frame of the emergency service message transmission time so that the MAC PDU decoder 503 wakes up and receives the MAC PDU from the BS. For changing the mode, the operation mode changer 505 may drive the timer based on the frame duration. The operation mode changer 505 controls the MAC PDU decoder 503 to examine whether there exists the MAC PDU including the emergency service message, that is, if there exists the MAC PDU including the CID of the emergency service message among the MAC PDUs received until the timer expires. The operation mode changer 505 controls the MAC PDU decoder 503 to extract and send the corresponding emergency service message to the upper layer when detecting the MAC PDU including the emergency service message. In the corresponding frame duration, one or more emergency service messages may be received and all or part of the one or more emergency service messages received may be fragmented. The operation mode changer 505 sustains the normal mode until all of the MAC PDUs constituting the one or more emergency service messages is received. When the reception time of all the MAC PDUs or the timer expiration falls within the listening window of the sleep mode or the paging listening interval of the idle mode, the operation mode changer 505 controls the MAC PDU decoder 503 to carry out the operation in the listening window or the paging listening interval. In contrast, when the reception time of all the MAC PDUs or the timer expiration falls outside the listening window of the sleep mode or the paging listening interval of the idle mode, the operation mode changer 505 controls the MAC PDU decoder 503 to return to the idle mode or the sleep mode. The operation mode changer 505 receives the allocation information of the MBS bursts from the MAC control message analyzer 514 and controls the MAC PDU decoder 503 to extract the emergency service message by decoding the MBS burst in the MBS region using the allocation information.

While the timer is set to the value based on the frame duration, the timer may be set to a fixed value or to the product of the unit time frame and the number of the emergency service messages, and the timer may not be set.

As set forth above, in a wireless communication system, a BS informs an MS of a CID used for the delivery of an emergency service message and information of a CS for processing the emergency service message using a DCD message. The MS receives and processes the emergency service message using the received information. Thus, the emergency service may be realized in the communication system, particularly, in the IEEE 802.16 communication system and the system service performance may be enhanced.

By defining the new Extended Broadcast Control Pointer IE message in the wireless communication system, the BS informs the idle and sleeping MS of the emergency service message transmission time and the information of the waiting time for waking up and receiving the emergency service message at the transmission time. The idle and sleeping MS wakes up at the time of the emergency service message transmission using the information, stands by during the waiting time, and thus receives the emergency service message. Therefore, it is possible to avoid the power consumption and the waste of the air resource in the transmission of the multiple Broadcast Control Pointer IE messages when the frame offset indicative of the emergency service message transmission time is quite short, which is 127 frames at maximum, in the Broadcast Control Pointer IE message.

To send the emergency service message over the MBS region in the wireless communication system, the BS adds the parameter (Existence of Emergency Service Message in MBS region) to the MBS_MAP IE and informs the MS of the presence or absence of the emergency service message in the MBS region. Thus, it is possible to prevent the MS from decoding the MBS-MAP message in every frame.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting an emergency service information at a base station (BS) in a wireless communication system, the method comprising:
    allocating a connection identifier (CID) used to transmit the emergency service information;
    determining a convergence sublayer (CS) type for processing the emergency service information;
    generating a control message comprising the allocated CID, and information relating to the determined CS type; and
    transmitting the control message to a mobile station (MS), wherein the control message comprises a downlink channel descriptor (DCD) message.

2. The method of claim 1, wherein, when the CS type for processing the emergency service information comprises a default CS type, the control message comprises only the allocated CID.

3. The method of claim 1, wherein the control message further comprises information relating to a priority of the emergency service information.

4. The method of claim 1, further comprising:
transmitting the emergency service information comprising the allocated CID to the MS.

5. A method for transmitting an emergency service information at a base station (BS) in a wireless communication system, the method comprising:
determining a transmission time of an emergency service information;
determining a waiting time for a mobile station (MS) to receive the emergency service information at the determined transmission time;
generating a broadcast control pointer information element (IE) which comprises information relating to the transmission time of the emergency service information and the waiting time to receive the emergency service information; and
transmitting a downlink (DL)-MAP message comprising the generated broadcast control pointer IE to the MS.

6. The method of claim 5, wherein the broadcast control pointer IE further comprises information relating to a type of a message to be transmitted at the determined transmission time.

7. The method of claim 5, further comprising:
transmitting the emergency service information to the MS at the determined transmission time.

8. A method for transmitting an emergency service information at a base station (BS) in a wireless communication system, the method comprising:
determining whether there exists the emergency service information to transmit in a multicast and broadcast service (MBS) region;
setting a field in an MBS_MAP information element (IE) according to the determination, the field indicative of the presence or absence of the emergency service information to be transmitted in the MBS region;
when it is determined that the emergency service information exists, determining a transmission time of the emergency service information and a waiting time for a mobile station (MS) to receive the emergency service information at the determined transmission time;
generating a broadcast control pointer information element (IE) which comprises information relating to the transmission time of the emergency service information and the waiting time to receive the emergency service information; and
transmitting a downlink (DL)-MAP message comprising the MBS_MAP IE with the set field or the broadcast control pointer IE to the MS.

9. The method of claim 8, further comprising:
transmitting the emergency service information in the MBS region at the determined transmission time.

10. The method of claim 9, wherein the emergency service information comprises a multicast connection identifier (MCID) pre-allocated for the transmission of the emergency service information.

11. A method for receiving an emergency service information at a mobile station (MS) in a wireless communication system, the method comprising:
receiving a downlink channel descriptor (DCD) message which comprises a connection identifier (CID) used to transmit the emergency service information, and information relating to a type of a convergence sublayer (CS) for processing the emergency service information; and
when receiving the emergency service information comprising the CID, processing the received emergency service information through the CS.

12. The method of claim 11, wherein the processing of the received emergency service information through the CS comprises processing the received emergency service information through a default CS when the DCD message does not comprise the information relating to the CS type for processing the emergency service information.

13. The method of claim 11, wherein the DCD message further comprises information relating to a priority of the emergency service information.

14. A method for receiving an emergency service information at a mobile station (MS) in a wireless communication system, the method comprising:
receiving a broadcast control pointer information element (IE) through a downlink (DL)-MAP message;
acquiring a transmission time of the emergency service information and information relating to a waiting time for the MS to receive the emergency service information at the transmission time using the received broadcast control pointer IE; and
receiving the emergency service information during the waiting time at the transmission time of the emergency service information.

15. The method of claim 14, wherein the broadcast control pointer IE further comprises information relating to a type of a message to be transmitted at the transmission time.

16. A method for receiving an emergency service information at a mobile station (MS) in a wireless communication system, the method comprising:
receiving a broadcast control pointer (IE) or a multicast and broadcast service (MBS)_MAP IE through a downlink (DL)-MAP message;
confirming setting of a field in the received MBS_MAP IE, the field indicative of the presence or absence of the emergency service information to be transmitted in an MBS region;
acquiring a transmission time of the emergency service information to receive the emergency service information at the transmission time using the received broadcast control pointer IE;
acquiring a waiting time for the MS to receive the emergency service information at the determined transmission time; and
when the field setting indicates the existence of the emergency service information to transmit in the MBS region, decoding an MBS MAP message.

17. The method of claim 16, further comprising:
acquiring allocation information of a corresponding MBS burst by decoding the MBS MAP message; and
decoding the MBS burst in the MBS region using the acquired allocation information and receiving the emergency service information.

18. The method of claim 17, wherein the MBS burst comprises a multicast connection identifier (MCID) pre-allocated for the transmission of the emergency service information.

19. An apparatus for transmitting an emergency service information of a base station (BS) in a wireless communication system, the apparatus comprising:
a media access control (MAC) control message generator configured to allocate a connection identifier (CID) used to transmit the emergency service information, to determine a convergence sublayer (CS) type for processing the emergency service information, and to generate a control message comprising the allocated CID, and information relating to the determined CS type; and a transmitter configured to transmit the control message to a mobile station (MS), wherein the control message comprises a downlink channel descriptor (DCD) message.

20. The apparatus of claim 19, wherein the transmitter is further configured to transmit the emergency service information comprising the allocated CID to the MS wherein the control message further comprises information relating to a priority of the emergency service information.

21. The apparatus of claim 19, wherein the MAC control message generator determines a transmission time of the emergency service information, determines a waiting time for the MS to receive the emergency service information at the determined transmission time, generates a broadcast control pointer information element (IE) which comprises information relating to the transmission time of the emergency service information and the waiting time to receive the emergency service information, and generates a downlink (DL)-MAP message comprising the generated broadcast control pointer IE, and the transmitter transmits the generated DL-MAP message to the MS and transmits the emergency service information to the MS at the determined transmission time.

22. The apparatus of claim 21, wherein the broadcast control pointer IE further comprises information relating to a type of a message to be transmitted at the determined transmission time.

23. The apparatus of claim 19, wherein the MAC control message generator determines whether there exists an emergency service information to transmit in a multicast and broadcast service (MBS) region, sets a field in an MBS_MAP IE according to the determination, the field indicative of the presence or absence of the emergency service information to be transmitted in the MBS region, and generates a DL-MAP message comprising the MBS_MAP IE with the set field, and the transmitter transmits the generated DL-MAP message to the MS and transmits the emergency service information to the MS over the MBS region.

24. An apparatus for receiving an emergency service information of a mobile station (MS) in a wireless communication system, the apparatus comprising:

a receiver for receiving a signal;

a physical layer decoder for providing a media access control (MAC) protocol data unit (PDU) by decoding the received signal in a physical layer;

a MAC PDU decoder for analyzing a header of the MAC PDU, for providing a corresponding payload to a MAC control message analyzer when a payload of the MAC PDU comprises control information, and for providing a corresponding payload to a receive data queue when the payload of the MAC PDU comprises traffic;

the MAC control message analyzer for acquiring a connection identifier (CID) used to transmit the emergency service information, and information relating to a type of a convergence sublayer (CS) for processing the emergency service information by analyzing a downlink channel descriptor (DCD) message from the MAC PDU decoder; and the receive data queue for providing the emergency service information from the MAC PDU decoder to a corresponding CS.

25. The apparatus of claim 24, wherein the MAC control message analyzer acquires a transmission time of the emergency service information and information relating to a waiting time for the MS to receive the emergency service information at the transmission time by analyzing a broadcast control pointer information element (IE) in a downlink (DL)-MAP message from the MAC PDU decoder, and the MAC PDU decoder provides the emergency service information received during the waiting time at the transmission time of the emergency service information, to the receive data queue.

26. The apparatus of claim 25, wherein the broadcast control pointer IE further comprises information relating to a type of a message to be transmitted at the transmission time.

27. The apparatus of claim 24, wherein the MAC control message analyzer confirms setting of a field in a multicast and broadcast service (MBS)_MAP IE of the DL-MAP message from the MAC PDU decoder and acquires allocation information of a corresponding MBS burst by decoding the MBS MAP message when the field setting indicates existence of the emergency service information to transmit in an MBS region, the field indicative of the presence or absence of the emergency service information to be transmitted in the MBS region, and the MAC PDU decoder extracts the emergency service information by decoding the MBS burst in the MBS region using the acquired allocation information and provides the extracted emergency service information to the receive data queue.

* * * * *